July 20, 1954  J. A. HJULIAN  2,684,268
HOSE NOZZLE VALVE
Filed Jan. 3, 1951

Inventor.
Julius A. Hjulian.
By Joseph O. Lange
Atty.

Patented July 20, 1954

2,684,268

UNITED STATES PATENT OFFICE 2,684,268

HOSE NOZZLE VALVE

Julius A. Hjulian, Palos Heights, Ill., assignor to Crane Co., Chicago, Ill., a corporation of Illinois Application January 3, 1951, Serial No. 204,115

4 Claims. (Cl. 299—150)

This invention relates to a valve, and, more especially, it is concerned with a valve of the hose nozzle type.

At the outset, an appreciation of the true merit of this invention will be better acquired by a brief summary of the features and operations thereof. The construction of this invention is an improvement of the presently known garden hose nozzles. This improvement resides primarily in a provision of a novel telescoping self-closing nozzle combined with the usual type of hose nozzle. The construction provides for operation of the nozzle by withdrawing the nozzle head over the nozzle body, thereby opening the nozzle valve.

As extended tests have shown, the desired rate and type of fluid flow can easily and readily be regulated to suit various operational requirements. Thus, an operator washing an automobile, for example, will be able to readily provide a desired rate of flow. Release of the nozzle head permits the self-closing of the valve which seats with line fluid pressure. As hereinafter will be apparent, this operation can be easily accomplished with only one hand of the operator required to hold and operate the nozzle.

To operate the nozzle of this invention as an ordinary hose nozzle, a predetermined length of withdrawal of the nozzle head will permit suitable setting thereof by engagement of threads between the head and the body and thus maintain the nozzle valve in the desired open position.

Therefore, it is an important object of this invention to provide a hose nozzle valve which is self-closing by line fluid pressure acting therewithin.

It is another important object of this invention to provide a hose nozzle type of valve which telescopes to permit ready and easy single-hand operation of obtaining a desired rate of flow therethrough.

Another object of this invention is the provision of a hose nozzle type of valve which combines a sliding valve operation of telescoping parts with the usual type of threaded operation of a hose nozzle.

Figure 1:
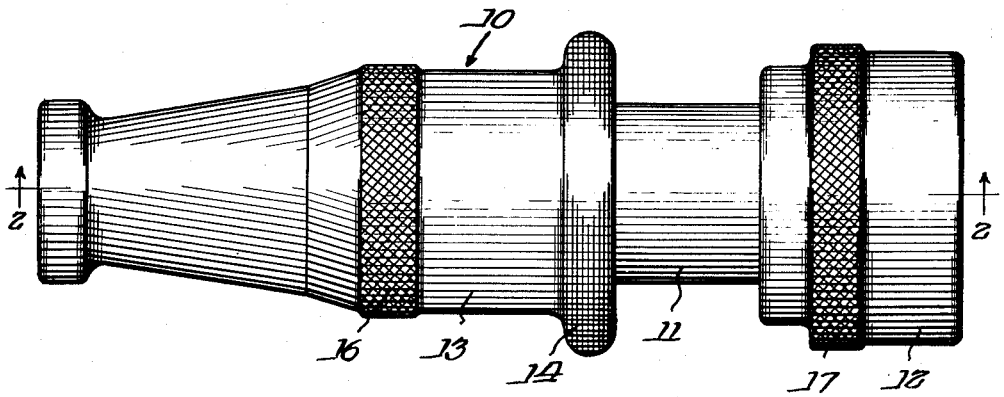

Other objects and advantages will become more readily apparent upon proceeding with the following description read in light of the accompanying drawings, in which Fig. 1 is an exterior view of a preferred embodiment of this invention.

Figure 2:
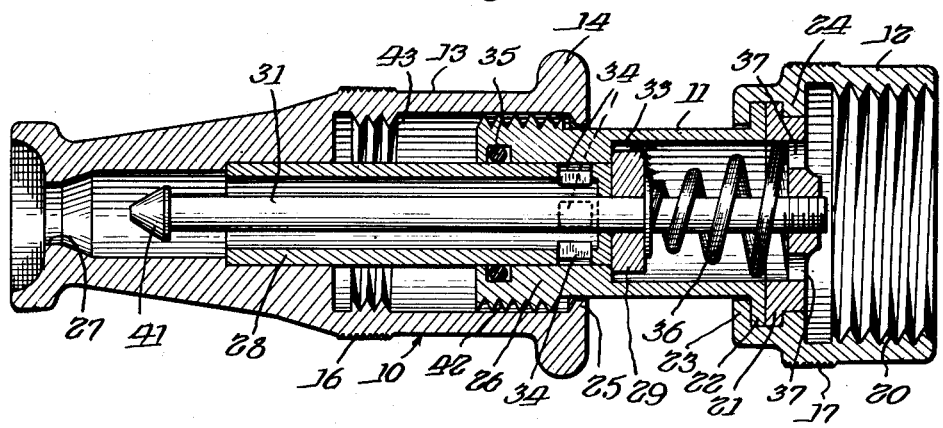

Fig. 2 is a sectional view taken on the line 2—2 of Fig. 1.

Similar reference numerals refer to similar parts throughout the several views.

As shown in Fig. 1, a preferred embodiment of this invention consists of a nozzle 10 having a body portion 11 which is attached to a hose connector 12 at a rearward end and a nozzle head 13 at the opposite end. Briefly describing the nozzle function, the hose connector 12 is suitably threadedly engaged to a hose (not shown) which provides the fluid inlet into the nozzle proper. Fluid pressure is then present in the nozzle which is operated by withdrawing the nozzle head 13 over the body 11, as the latter two elements are telescopically arranged. This operation opens the nozzle valve to release the fluid pressure within the nozzle 10 as will be described in more detail hereinafter in connection with Fig. 2.

To provide for easy operation of the nozzle, the nozzle head 13 is preferably provided with an annular flange 14 which can be readily gripped by the operator. Also, annularly knurled portions 16 and 17 can be provided on the nozzle head and the hose connector portions, respectively, to insure good gripping surfaces on the nozzle. The above described construction permits the previously referred to one-hand operation as the nozzle is both held and easily operated by only one hand.

Fig. 2 shows the novel nozzle details of the hose connector 12, the body 11, and the head 13. The hose connector provides the fluid inlet opening in the nozzle and is internally threaded, as at 20, to be readily connected to a hose or the like (not shown). The opposite end of the connector 12 is first cylindrically formed, and, upon assembly of a circularly shaped back plate 21 and an annularly shouldered body end 22 with the connector, the connector end limit portion 23 is spun or otherwise turned inwardly to secure the back plate 21 and the body shoulder 22 within the connector. An annular inwardly disposed connector shoulder 24 further secures the backplate 21 and the body shoulder 22 in juxtaposition within the hose connector 12.

Thus, the cylindrically shaped body 11 is attached to the connector 12 to align therewith and extend therefrom. The body opposite end 26 is preferably externally threaded for a reason hereinafter described, while the intermediate portion of the body is smooth. The nozzle head 13 is positioned over the body 11 to slidably telescope therewith as the rearward end 25 of the head 13 is rolled or otherwise turned inwardly as shown after being positioned with the body and the head is thereby permanently slidably mounted on the body. The body end 26 can thus permit the head to slide thereon as the body threads contact the internal bore of the head to guide against relative rocking motion during nozzle operation. The opposite end of the nozzle head 13 provides the fluid outlet 27.

Within the bore of the head 13, a flow tube 28 is preferably press-fitted at one end thereof to extend rearwardly into the body 11 to be slidable therewithin. Thus, the tube 28 is fixedly connected to the head 13 with one end of the tube being slidably received within the body 11, which latter end is formed with a reduced end opening and a plurality of annularly arranged lateral apertures 34, as indicated. A seal O-ring 35 is preferably located, as shown, between the body 11 and the head 13 to prevent leakage therebetween. A flow rod 31 is mounted within the nozzle along the axis thereof and is preferably threaded into a central opening in the back plate 21 to project through the said reduced end opening of tube 28 which is slidable thereon. Mounted on the rod 31, behind the tube 28, is a stop and seal member 29 which seats on an annular shoulder 33 in the body 11 to selectively interrupt fluid flow through the nozzle. It should be noted that a coil spring 36 is preferably disposed between the back plate 21 and the valve 29 to yieldingly urge the latter toward the seat 33 in addition to fluid pressure which tends to seat the valve.

In the operation of the nozzle, line fluid is admitted past apertures 37 annularly spaced in back plate 21, and the fluid enters the body 11. Axial movement of the nozzle head 13 over the body 11 inwardly displaces flow tube 28 which unseats valve 29 and exposes tube apertures 34 to permit fluid flow into the said tube and around the flow rod 31 to discharge outwardly through the opening 27.

Release of the nozzle head 13 permits self-closing of the nozzle as line fluid pressure and coil spring 36 act against valve 29 to force it toward seat 33 where fluid flow is interrupted.

It should thus be apparent that relatively easy touch operation and self-closing of a nozzle is accomplished by this invention. The type of discharge acquired from the nozzle, either heavy or fine, depends, of course, on the relation between the head 41 of the flow rod and the outlet 27. In the drawing shown, the flow rod 41 is spaced a substantial distance from the outlet 27; thus, a heavy type of discharge is obtained during the above described operation. Of course, the rate of flow may be varied according to the amount of axial movement of the head 13 which displaces the seal member 29 and exposes the apertures 34.

It is important to understand that another operational feature exists in this invention. Upon fully moving the nozzle head 13 axially over the body 11, body threads 42 engage head threads 43, whereupon the said threaded engagement secures the telescoped relation of the head and body and maintains the stop and seal member 29 in an open or unseated position relative to the shoulder 33 to thus expose the ports 34.

It should also be noted that the type of discharge obtained in the above described initial threaded engagement position is also of a heavy type in the construction shown. But, upon further engagement, outlet 27 is drawn closer to flow rod head 41 thereby providing an orifice which produces a light spray. This threaded adjustment can easily be made according to the spray desired.

It should be obvious that the telescopic relation could be reversed within the scope of this application and provide for the nozzle head to be telescoped within the nozzle body; and, also, the valve seat could be movable and the valve closure be made stationary to thereby control the flow of fluid through the valve.

Thus, a relatively cheap and simple device has been obtained, and, although this invention has been described in specific forms, it is susceptible to numerous changes, and should, therefore, be limited only by the spirit thereof and the scope of the appended claims.

I claim:

1. A hose nozzle comprising a pair of telescopically arranged relatively axially movable casing portions slidably movable relative to each other and having a liquid inlet opening and a liquid outlet opening with an intermediate liquid passage therebetween, each of the said casing members having a threaded portion, said casing portions being arranged to provide for relative axial movement by freely sliding one within the other and by further telescoping with a threaded engagement therebetween on the said threaded portions, a shoulder formed on one of said casing portions to surround said liquid passage, a flow-tube fixedly mounted against axial movement within one casing portion and slidingly receivable in the other casing portion, a stop and seal member resiliently mounted within said nozzle in abutting relation to an end portion of the said flow tube and operable on said shoulder in response to said casing portions relative axial movement to thereby selectively interrupt liquid flow through said nozzle, the said flow tube having a ported portion selectively communicable with the liquid inlet opening to permit flow through said tube upon predetermined telescopic movement of the casing portions toward each other and after predetermined movement of said stop and seal member from the said shoulder.

2. Claim 1, including a liquid flow rod mounted in said flow passage and having a head end cooperating with the liquid outlet opening upon occurrence of said telescopic movement of the said casing portions toward each other whereby the form and volume of liquid discharge from said nozzle is adjustable by axial relation of said liquid outlet to the head end of said flow rod.

3. A hose nozzle comprising a pair of telescopically arranged relatively axially movable casing portions consisting of a nozzle head and a nozzle body having a liquid inlet opening and a liquid outlet opening with an intermediate liquid passage therebetween, said casing portions being relatively axially movable by freely sliding one upon the other, each of said casing head and body portions including cooperating threaded sections providing for further telescoping engagement therebetween, a shoulder formed within one of said casing portions to surround said liquid passage, a stop and seal member resiliently mounted within said nozzle body and operable on said shoulder in response to said casing portions relative axial movement of sliding and threaded engagement to thereby selectively interrupt liquid flow through said nozzle, a flow tube fixedly mounted within said nozzle head and having an apertured end portion cooperating with the said stop and seal member and said nozzle head upon predetermined axial movement of the latter member toward the inlet opening to permit liquid flow through said flow tube into said outlet, the said stop and seal member being moved from the said shoulder substantially concurrently with the occurrence of said axial movement of the nozzle head toward the body.

4. The subject matter of claim 3, including a flow rod mounted within said nozzle body and having an end portion cooperating with the liquid outlet opening whereby upon relative axal movement of said nozzle head toward the said nozzle body the said rod end portion is moved toward liquid outlet to provide for reduced liquid discharge.

References Cited in the file of this patent

UNITED STATES PATENTS

| Number | Name | Date |
|---|---|---|
| 174,781 | Clemens | Mar. 14, 1876 |
| 351,453 | Messinger | Oct. 26, 1886 |
| 473,672 | Schrader | Apr. 26, 1892 |
| 1,625,042 | McArdle | Apr. 19, 1927 |
| 1,913,274 | Hayden | June 6, 1933 |
| 2,064,794 | Klauminzer | Dec. 15, 1936 |
| 2,333,767 | Davis | Nov. 9, 1943 |
| 2,343,134 | Cawood | Feb. 29, 1944 |
| 2,370,182 | Morrow et al. | Feb. 27, 1945 |
| 2,502,301 | Alderfer | Mar. 28, 1950 |